Patented June 23, 1953

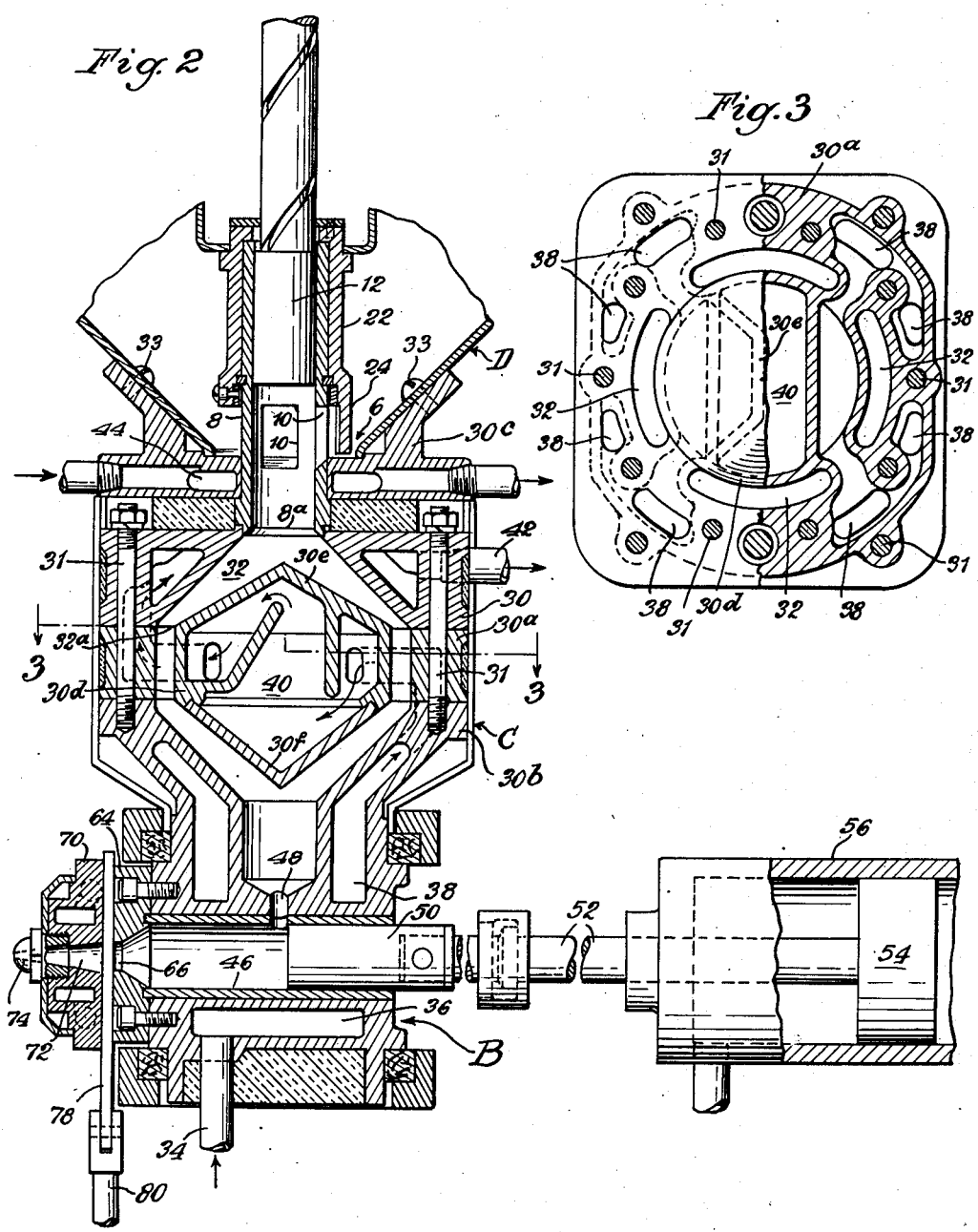

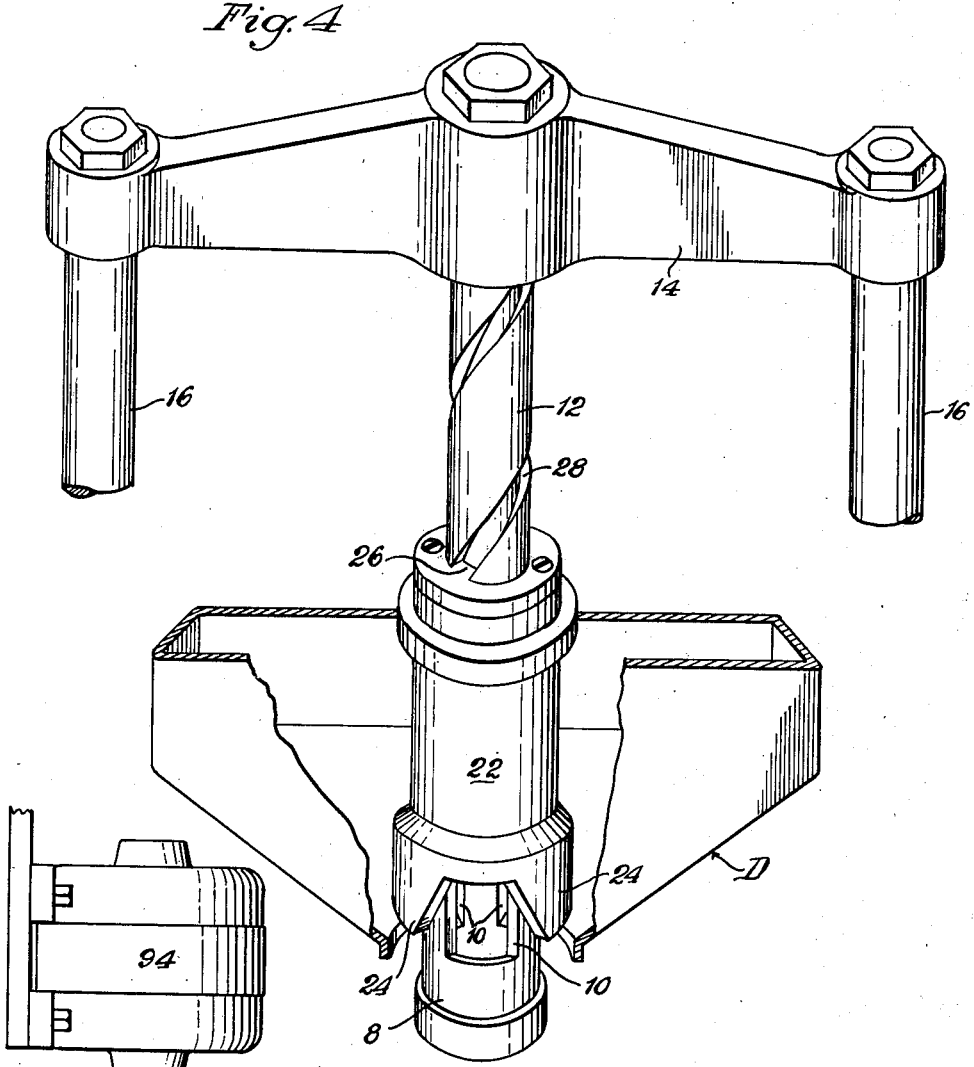

2,642,623

UNITED STATES PATENT OFFICE 2,642,623

PLASTICIZING MACHINE

George S. Bohannon, Colorado Springs, Colo., assignor to Crown Machine and Tool Company, Inc., Fort Worth, Tex., a corporation of Texas Application June 4, 1952, Serial No. 291,657

6 Claims. (Cl. 18—30)

This invention relates to improvements in molding machines of the character used for molding plastic materials, particularly of thermoplastics.

The object of this invention is to improve the construction of machines for this purpose, to provide for the molding of plastic materials with less pressure than has been required heretofore, to simplify and reduce the cost of machines for the purpose, and to obtain improved molded products.

According to one embodiment of the invention, the machine is constructed so as to plasticize the material before it is directed into the injection chamber, whereby the injection plunger serves the purpose only of forcing the material into the mold. Therefore, the injection is much more efficient in terms of pressure in the mold since the injection plunger has only this one function, and is not required to force cold granular material into the plasticizing chamber. This greater efficiency makes possible the production of perfect moldings of plastic material at comparatively low pressure on the injection plunger, whereas other machines used heretofore would have required considerably greater pressure when the plunger thereof was required to force the granular plastic material into a plasticizing chamber and therethrough into the mold.

It is a further object of the invention to improve the manner of plasticizing the material in the machine. In order to obtain maximum efficiency, the internal shape of the plasticizing chamber is so constructed preferably that there is a rapid increase in volume in the flow passageway from the point at which the granules enter to the point at which maximum plasticity is reached, where the material becomes a viscous liquid. It is in the form of a viscous liquid when directed into the injection cylinder, and may be handled thereby more efficiently for better molding action.

A further object of this invention is to improve the heating efficiency of a plasticizing unit.

A still further object of this invention is to reduce the cost of plasticizing machines by facilitating a more economical construction of such machines.

Other objects will appear from time to time in the course of the ensuing specification and claims.

This application is a continuation in part of my co-pending application, Serial Number 710,116, filed November 15, 1946, now abandoned.

Referring generally to the drawings:

Figure 2 is an enlarged sectional view of the pre-plasticizing unit of the machine;

Figure 3 is a sectional view of the device shown in Figure 2 taken along the lines 3—3 of Figure 2;

Figure 4 is an enlarged detail view of a portion of the feeding mechanism with certain parts broken away for purposes of clarity; and Figure 5 is a diagrammatic showing of an alternative feeding mechanism.

Like parts are indicated by like symbols throughout the specification and drawings.

Figure 1:
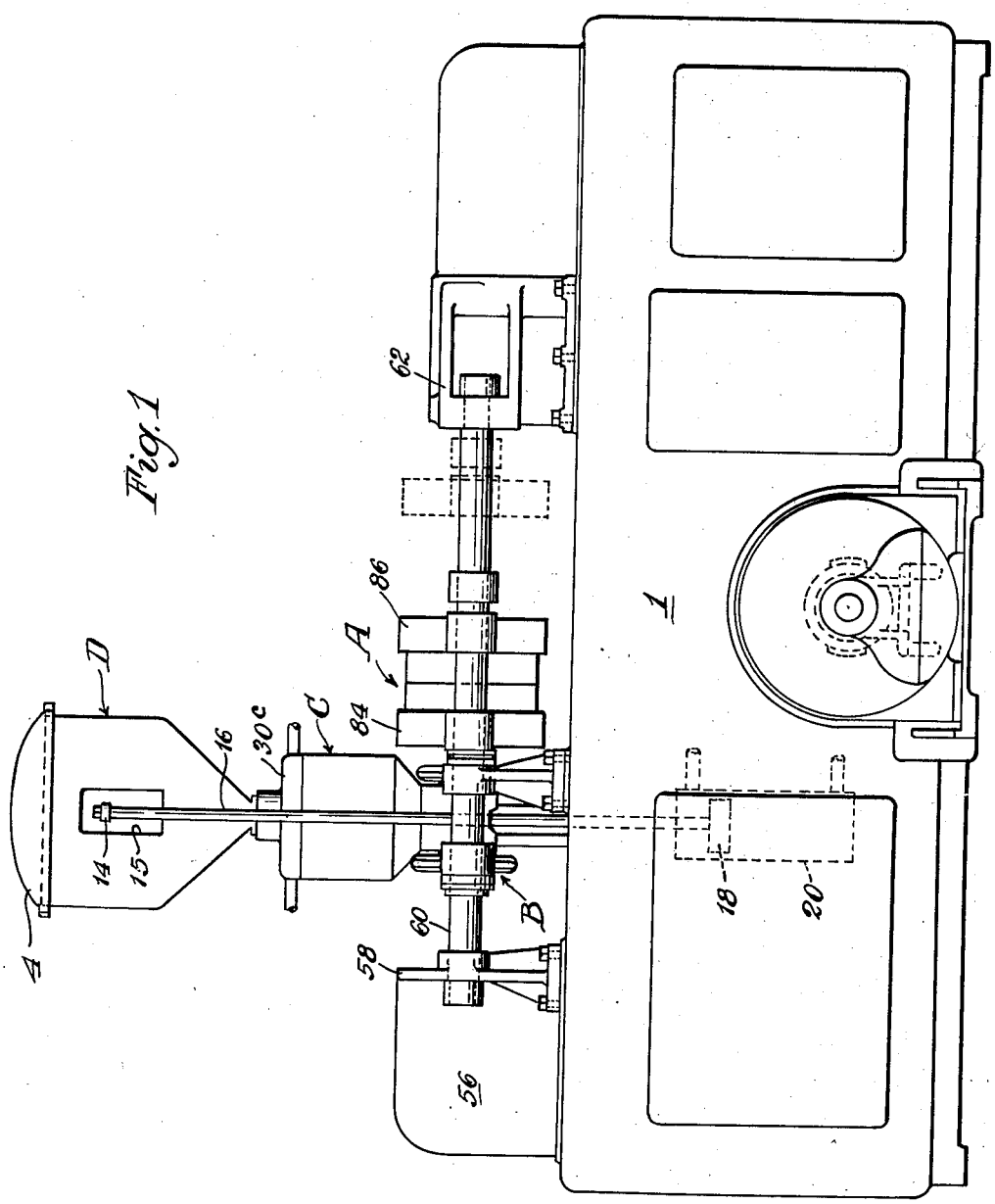
Figure 1 is a side elevational view of my improved molding machine.

Figure 1 shows the entire molding machine of my invention. I indicates a supporting frame or base which may be of any suitable construction and adapted to support the operative component parts of my invention. Indicated generally at A is any suitable molding mechanism suitably supported on the base and adapted to receive plasticized material from an injection cylinder designated generally at B. The injection cylinder B receives plasticized material from a pre-plasticizing unit designated generally at C. A supply hopper D is adapted to contain any suitable powdered or granular material and to feed such material to the preplasticizing unit C.

According to my invention, solid material is fed into a plasticizing stage, as represented by the preplasticizing unit C. When in the plasticizing stage, the material is heated to a temperature sufficient to plasticize the material. The plasticized material is then fed into a separate injection stage, as represented by the injection cylinder and piston assembly B, from where it is forced under a pressure on the order of 3,000 to 8,000 pounds per square inch into the mold A. I have found an injection pressure of approximately 4,500 pounds per square inch to be advantageous. Whereas prior plasticizing processes have utilized injection pressures on the order of 20,000 pounds per square inch, in my method, the aforementioned lower pressure is utilized. The maintenance of the separate plasticizing and injection stages permits more uniform plasticization of material and a more rapid injection stroke of the piston in the injection cylinder due to the relatively lower pressures involved, and the fact that no plasticizing work is performed in the injection stage.

As seen best in Figure 2, the supply hopper D, preplasticizing unit C, and injection cylinder B are joined together in a manner of assembly to enable flow of material downwardly from the supply hopper to the preplasticizing unit and then to the injection cylinder. As shown in Figure 2, the supply hopper, preplasticizing unit, and injection cylinder are in vertically spaced relation. The assembly so formed may be supported on the base 1 in any suitable fashion.

Supply hopper D is adapted to receive the granular molding material, which is preferably a thermoplastic material such as cellulose acetate, polystyrene, methacrylate, etc. The hopper D is constructed of a sufficient capacity to contain the desired quantity of material and is provided with a cover 4 thereon to close the open top thereof. The bottom portion of the hopper D tapers downwardly and inwardly to a discharge opening 6, through which the material is adapted to be fed from the hopper.

Seated in the discharge opening 6 and upstanding within the hopper D is a stationary sleeve 8 in fixed position in the hopper but having a plurality of openings 10 through the sides thereof at the bottom of the hopper, through which the material may drop or feed from the hopper into the sleeve 8. In the form shown, three such openings are provided. This material is fed downward through the sleeve 8 and discharge opening 6 by a plunger 12 slidably mounted in the sleeve 8. The plunger is adapted to be reciprocated between an upper position, shown in Figure 2, to a lower position where the base of the plunger approaches the base of the sleeve. In its raised position, as illustrated in Figure 2, the plunger 12 will allow the granular molding material to pass down through the openings 10 into the sleeve 8. Then when the plunger 12 is forced downward in the sleeve this material will be directed through a discharge opening 8a in the lower portion of the sleeve by the force of the plunger.

The plunger is reciprocated by a cross-head 14 which is connected with the upper end of the plunger 12, as shown in Figure 4. The cross-head 14 extends transversely of the hopper D through a tubular opening 15 that extends from side to side of the hopper and forms a transverse opening therethrough, out of communication with the interior of the hopper. The opposite ends of the cross-head 14 project to points externally of the hopper and are connected with rods 16 which in turn are connected with a piston 18 (Figure 1), mounted on a hydraulic cylinder 20 that is located within the base 1.

In order to insure the flow of the granular material through the openings 10 into the sleeve 8, an agitator 22 is provided in the hopper D. The agitator 22 is journaled on the sleeve 8 and is fixed against axial movement relative thereto. The lower end of the agitator 22 has depending fingers 24 (Figure 2) which overlap the openings 10 and are enlarged somewhat diametrically with respect to the sleeve, so that upon rotation of the agitator 22 the material in the bottom portion of the hopper will be agitated sufficiently to cause this material to flow through the openings 10 into the discharge opening of the hopper. Rotation of the agitator 22 is caused by engagement of a projection 26 (Figure 4) on the agitator 22 with a spiral groove 28 formed in a side of the plunger 12. Thus upon reciprocating movement of the plunger, the agitator 22 will be rotated about the sleeve 8 to facilitate the flow of the granular material from the hopper D into the sleeve and discharge opening of the hopper by gravity.

As shown in Figure 2, a plasticizing head comprising sections 30, 30a and 30b supports the hopper thereon by an interposed section 30c secured to section 30a. These parts 30, 30a and 30b are secured together by tie-bolts 31, which serve to secure the members of the plasticizing head together. The hopper D is secured by bolts 33 to section 30c which is water-cooled. These head sections 30, 30a and 30b contain a plasticizing chamber generally designated at 32, which chamber tapers downwardly and outwardly from the discharge opening 6 of the hopper and end portion 8a of the sleeve, and receives the granular material therefrom. In order to obtain maximum efficiency, the internal shape of the chamber 32 preferably is so constructed that there is a rapid increase in cross-sectional area from the point of flow at which the granules enter to the point of flow at which plasticity is reached. This point is at the circumference 32a of the upper conical portion of the chamber 32. The material passes downwardly therefrom through passageways formed in the plasticizing head 30, as indicated in Figure 2, and into a lower inverted conical portion of the chamber in the section 30b. As will be apparent from Figure 2, the sections 30, 30a and 30b are so constructed as to define an internal chamber having walls 32a. A member 30d having an upper conical portion 30e and a lower inverted conical portion 30f is supported in the interior of this internal chamber by any suitable fin sections joined to the section 30a. The interior walls of the section 30 together with the upper conical portion 30e defines the passage of increasing cross sectional area for the flow of material. The upper conical portion 30e serves as a spreader plate obtusely opposed to incoming material and together with the interior walls of the chamber serve to maintain the flow of material in a relatively thin layer, for maximum uniformity of heating of the material.

During movement through the chamber 32, the thermoplastic material is heated to cause the material to be transformed substantially into a viscous liquid before being discharged from the plasticizing chamber. This heat is supplied preferably by hot oil from a supply pipe indicated at 34 into and through passageways 36 and 38, the latter of which extends upward around the chamber 32 and communicates with an interior heating chamber 40 in the internal member 30d. The hot oil passes out of the chamber 40 through the passageways shown and is discharged at 42. By passing up through the bottom of the plasticizing chamber, a maximum heating effect is obtained, thus producing maximum plasticity in the injection cylinder.

Granular plastic material in the hopper D is prevented from being heated by conduction by the circulation of a cooling medium, such as cold water, through a duct 44 in a water jacket 3 surrounding the sleeve 8 thereof.

At the bottom of the head 30, 30a, 30b is an injection cylinder 46 surrounded by the heating chamber 36. The cylinder 46 normally is in open communication with the plasticizing chamber 32 at the bottom thereof through a port 48 to receive the viscous liquid material discharged from the plasticizing chamber. A charge of liquid material will be forced through the port 48 by the flow of material through the plasticizing chamber into the injection chamber 46 ready for injection under the action of a piston 50 operatively mounted in the cylinder 46 and adapted to uncover the port 48 to permit filling of the cylinder 46 with plasticized material as required, and then to close the port 48 to prevent the escape of additional material from the injection cylinder.

The injection piston 50 has a connecting rod 52 extending outwardly from one end of the cylinder 46 to a piston 54 operatively mounted in a hydraulic cylinder 56 (Figure 2). The cylinder 56 is mounted above the base 1 as shown in Figure 1 and is connected with a bracket 58, shown as in the form of a casting rigidly mounted on the base 1 in upstanding relation therefrom.

The bracket 58 has a pair of tie-rods 60 secured at one end thereto and extending lengthwise of the base 1 on opposite sides of the injection cylinder 46. The opposite ends of the tie-rods 60 are connected with a bracket 62, also shown as a casting, rigidly mounted upon the base 1 in upstanding relation therefrom. The tie-rods 60 connect together the brackets 58 and 62 and the operative parts of the machine interposed therebetween.

The opposite end of the cylinder 46 is closed by a plate 64 having a discharge opening 66 therein, which plate is secured to the structure by screws 68. Mounted beside the closure plate 64 and supported in any suitable fashion is a nozzle head 70 having an injection opening 72 therethrough in position to register with the opening 66. At the discharge end of the opening 72 is an injection nozzle 74. The injection head 70 is provided with a hot oil jacket 76 therearound, in the form shown, to maintain the heated condition of the material when injected therethrough.

Mounted between the closure plate 64 and the injection head 70 is a gate 78 adapted to control communication through the openings 66 and 72. The gate 78 is slidably mounted for movement to allow discharge from the cylinder 46 through the opening 72 during the forward movement of the injection piston 50, and then to close at the end of the injection cycle, while allowing the piston 50 to be withdrawn. The gate 78 is adapted to be reciprocated by a connecting rod 80 attached thereto and extending to any suitable hydraulic cylinder and piston assembly (not shown).

The mold A may take any one of several forms, and is therefore shown diagrammatically in Figure 1. Essentially, the mold includes cavities into which the plasticized material is fed from nozzle 74. As shown in Figure 1, the mold is supported and confined by a pair of platens 84 and 86 slidably mounted on the tie rods 60.

In Figure 5 I have shown an alternative feeding mechanism adapted to supply granular material from the hopper or container D to the preplasticizing unit C. This feeding mechanism includes essentially a screw conveyor 90 journaled on any suitable supporting mechanism 92 for rotation about a vertical axis substantially aligned with the axis of the passage between the supply hopper and the preplasticizing unit. The conveyor may be rotated by means of any suitable motor 94. When it is desired to feed material from the supply hopper to the preplasticizing unit, operation of the motor is initiated and material from the hopper is delivered by the screw conveyor to the plasticizing unit.

Although I have shown an operative form of my invention, it will be recognized that many changes in the form, shape and arrangement of parts can be made without departing from the spirit of the invention, and my showing is, therefore, to be taken as, in a sense, diagrammatic, and not in any limiting sense, and the invention herein should be limited only as defined by the scope of the hereinafter appended claims. For example, the spreader plate 30e may be made generally convex in lieu of conical, to define with the interior walls of the sections a passageway of increasing cross-sectional area.

The use and operation of my invention are as follows:

Solid material is fed from the supply hopper or container D to the preplasticizing unit C. The piston and agitator of Figures 1 through 4 or the screw conveyor of Figure 5 may be utilized to feed the solid material. The feeding mechanisms are operated whenever necessary to fill the passageway 32 in the preplasticizing stage or unit. The passageway 32 is so formed that the cross-sectional area of the passageway increases from the point just after the point at which material enters the unit (at 8a) to a point substantially midway of the unit (32a). A spreader plate 30e opposed to the flow of material, in the passageway, defines with the walls of the chamber this passageway of increasing cross-sectional area. These walls and the spreader plate are heated by the circulation of oil through the passageways 34, 36 and 38. As the material passes through this defined passageway, it is heated to a temperature sufficient to complete the plasticization of material substantially by the time the material reaches the medial portion of the passageway (32a). The increasing cross-sectional area provides for expansion of flow of the material undergoing plasticization and also provides for an increased heating area of the walls of the chamber with which the material is in heat transferring relationship.

Plasticized material is then fed into the injection stage where it is forced under a pressure on the order of 3,000 to 8,000 pounds per square inch into a mold. As material is forced into and consumed by the mold, the feeding mechanism is operated to deliver another charge of solid material into the preplasticizing unit C. It will be apparent that forcing material into the preplasticizing unit by the feeding mechanism will produce a downward flow of material into the injection cylinder.

The arrangement of the spreader plate 30e and housing walls define a passageway of such a size as to maintain a relatively thin layer of material as it undergoes plasticization, resulting in more uniform heating of the material.

The maintenance of the separate plasticizing and injection stages together with the lower injection pressure results in a machine of simpler construction and lower cost.

I claim:

1. In a machine for molding plastics, an injection cylinder, a piston therefor, and means for moving the piston through an injection stroke, a container for solids, and a preplasticizing unit between the container and the injection cylinder, said unit including a passage member defining a feed passage adapted to receive solids from the container, a feed plunger reciprocable in said feed passage, means for reciprocating the feed plunger, and means for plasticizing the solids delivered through said feed passage by said feed plunger including a transversely extending spreader having a laterally extending face obtusely opposed to material flowing along the axis of the feed passage, and a housing defining, with said spreader, a substantially unobstructed passage extending radially from the path of the plunger to the edge of the spreader face, said housing and spreader having opposed walls spaced apart and defining a space increasing outwardly in cross-sectional area and at all points greater in cross-section than the feed passage, means for heating the walls of the said space sufficiently substantially to complete the plasticization of the material by the time that it reaches the outer edge of the spreader face, said housing and spreader having parts defining a delivery passage extending from the outer edge of the spreader face to a restricted delivery opening communicating with the injection cylinder intermediate the ends of the stroke of the piston in said cylinder.

2. The structure of claim 1 characterized by and including a feed plunger reciprocable through a stroke which includes a part of the interior of the container whereby, upon withdrawal of the plunger into the container, solids in the container are free to enter the feed passage for movement by the feed plunger upon its return stroke.

3. The structure of claim 1 characterized by and including a nozzle valve for the injection cylinder, and means for actuating the nozzle valve in predetermined relation to the injection piston.

4. In a machine for molding plastics, an injection cylinder, a piston therefor, and means for moving the piston through an injection stroke, a container for solids, and a preplasticizing unit between the container and the injection cylinder, said unit including a passage member defining a feed passage adapted to receive solids from the container, means for plasticizing solids delivered through said feed passage including a transversely extending spreader having a laterally extending face obtusely opposed to material flowing along the axis of the feed passage, and a housing defining, with said spreader, a substantially unobstructed passage extending radially from the feed passage to the edge of the spreader face, said housing and spreader having opposed walls spaced apart and defining a space increasing outwardly in cross-sectional area and at all points greater in cross-section than the feed passage, means for heating the walls of the said space sufficiently substantially to complete the plasticization of the material by the time that it reaches the outer edge of the spreader face, said housing and spreader having parts defining a delivery passage extending from the outer edge of the spreader face to a restricted delivery opening communicating with the injection cylinder intermediate the ends of the stroke of the piston in said cylinder.

5. In a machine for molding plastics, an injection cylinder, a piston therefor, and means for moving the piston through an injection stroke, a container for solids, and a preplasticizing unit between the container and the injection cylinder, said unit including a passage member defining a feed passage adapted to receive solids from the container, means for feeding material through said feed passage, means for plasticizing solids delivered through said feed passage including a transversely extending spreader having a laterally extending face obtusely opposed to material flowing along the axis of the feed passage, and a housing defining, with said spreader, a substantially unobstructed passage extending radially from the feed passage to the edge of the spreader face, said housing and spreader having opposed walls spaced apart and defining a space increasing outwardly in cross-sectional area and at all points greater in cross-section than the feed passage, means for heating the walls of the said space sufficiently substantially to complete the plasticization of the material by the time that it reaches the outer edge of the spreader face, said housing and spreader having parts defining a delivery passage extending from the outer edge of the spreader face to a restricted delivery opening communicating with the injection cylinder intermediate the ends of the stroke of the piston in said cylinder.

6. In a machine for molding plastics, a supporting frame, an injection cylinder and piston assembly mounted on the frame and adapted to direct plasticized material into a mold, a container for solids on the supporting frame, a preplasticizing unit mounted on the supporting frame and positioned to receive material from the container and deliver material to the cylinder and piston assembly, said preplasticizing unit including a housing having a passageway positioned to receive material from the container and an internal spreader defining with said housing a second passageway increasing in cross-sectional area radially outwardly in a direction away from said first-named passageway and adapted to receive material from said first-named passageway and deliver material through a third passageway leading to said cylinder and piston assembly, and means for heating the second-named passageway to a temperature sufficient to plasticize the material received from the container before delivery to the cylinder and piston assembly.

GEORGE S. BOHANNON.

References Cited in the file of this patent
UNITED STATES PATENTS

| Number | Name | Date |
|---|---|---|
| 2,107,190 | Shaw | Feb. 1, 1938 |
| 2,111,857 | Jeffery | Mar. 22, 1938 |